(12) United States Patent
Metz et al.

(10) Patent No.: US 11,501,054 B2
(45) Date of Patent: Nov. 15, 2022

(54) LAYOUT GENERATION FOR AN ELECTRONIC DOCUMENT THAT INCLUDES A WEB OBJECT

(71) Applicant: Apple Inc., Cupertino, CA (US)

(72) Inventors: Jean Sebastiaen Metz, Sunnyvale, CA (US); Glenn Wolters, San Jose, CA (US); Matthijs Jacob Frederik Zoon, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 1285 days.

(21) Appl. No.: 15/274,924

(22) Filed: Sep. 23, 2016

(65) Prior Publication Data

US 2017/0357621 A1    Dec. 14, 2017

Related U.S. Application Data

(60) Provisional application No. 62/349,017, filed on Jun. 12, 2016.

(51) Int. Cl.
| | | |
|---|---|---|
| *G06F 40/154* | (2020.01) | |
| *G06F 40/106* | (2020.01) | |
| *G06Q 30/02* | (2012.01) | |
| *G06F 16/958* | (2019.01) | |
| *G06T 11/60* | (2006.01) | |

(52) U.S. Cl.
CPC .......... *G06F 40/106* (2020.01); *G06F 16/986* (2019.01); *G06F 40/154* (2020.01); *G06Q 30/0277* (2013.01); *G06T 11/60* (2013.01)

(58) Field of Classification Search
CPC .... G06F 40/106; G06F 16/986; G06F 40/154; G06F 40/10; G06F 16/90; G06F 16/80
See application file for complete search history.

(56) References Cited

U.S. PATENT DOCUMENTS

| | | | |
|---|---|---|---|
| 8,615,712 B2 | 12/2013 | Porter et al. | |
| 9,282,145 B2 | 3/2016 | Wei et al. | |
| 2004/0148571 A1* | 7/2004 | Lue | G06F 17/30905 715/239 |
| 2014/0298159 A1 | 10/2014 | Kim et al. | |
| 2015/0046789 A1* | 2/2015 | Wei | G06F 17/2247 715/234 |
| 2015/0199708 A1* | 7/2015 | Ying | G06Q 30/0241 705/14.4 |
| 2015/0347432 A1 | 12/2015 | Tsai et al. | |

* cited by examiner

*Primary Examiner* — Sanchita Roy
(74) *Attorney, Agent, or Firm* — Fletcher Yoder PC

(57) ABSTRACT

A method of determining a layout for an electronic document comprising a web object that includes a set of components is provided. The method, for each component of the web object, injects code into a web frame used to retrieve the component of the web object. The program sends a request to a web content retriever to retrieve the web object. The program, for each component of the web object, receives a message at the layout generation application from the injected code in the corresponding web frame indicating the completion of the retrieving of the component. Each message includes the height of the corresponding web object component. The method determines a layout for the web object by using the height of the web object components after the messages received from the injected code indicate that every component of the web object is retrieved.

20 Claims, 14 Drawing Sheets

LAYOUT GENERATION FOR AN ELECTRONIC DOCUMENT THAT INCLUDES A WEB OBJECT

CLAIM OF BENEFIT TO PRIOR APPLICATIONS

This application claims the benefit of U.S. Provisional Patent Application 62/349,017, filed Jun. 12, 2016. U.S. Provisional Patent Application 62/349,017 is incorporated herein by reference.

BACKGROUND

Many electronic devices utilize a local layout generator that determines the layout for an electronic document before rendering the document on the device display screen. The layout generator optimizes the layout based on the type of the document and the size and orientation of the device display screen. For instance, a news feed displays a summary page that may include excerpts of several articles. When a user selects one of the articles, a local layout generator on the device determines a layout for rendering the article and optimizes the layout based on different criteria.

For an article that includes many components such as text, image, video, etc., there may be a delay between the selection of the article from the summary page and rendering of the article on the device display due to the time required to determine a layout for the article. It is also desirable to determine a location on the layout for including an advertisement. In addition, an article may include a web object such as a Twitter card or a Facebook post. These web objects have to be retrieved from different content servers than the content server of the article publisher. The layout has to be determined based on the height of these web objects.

SUMMARY

Some embodiments provide a novel two-step process to determine the layout of an electronic document (e.g., a webpage, article, etc.). In some embodiments, the electronic document is selected from a summary page that displays summaries of several documents. In the first pass, an image of the selected document is identified in the summary page and the end of the image is marked as a target location for doing a partial layout. A partial layout that includes a location for the image is then determined and stored. The image is animated to the determined location.

In the second pass, while the image is being animated, a full layout is determined for the document. The full layout uses the stored results of the first pass and generates the layout from the target location to the end of the document. In some embodiments, rendering of the document is also started based on the partial layout while the image is being animated.

Some embodiments provide a novel method for placing an advertisement on an electronic document. The method determines a layout to render the electronic document based on different criteria such as size, orientation, and resolution of a device display screen. The method then selects an advertisement to display on the document. The method determines a location in the document layout to display the advertisement.

The method identifies a region in the layout adjacent to the location identified for the advertisement. The method then adjusts the identified region in the layout to place the advertisement on the document without changing the rest of the layout. The method then renders the electronic document and the advertisement using the adjusted layout.

Some embodiments of the invention provide a novel method for determining a layout for an electronic document that includes a web object. The method receives an identification of a web object in the document and determines the type of the web object. Examples of web objects include different objects such as Twitter cards, Facebook posts, Vine videos, Instagram photos, etc., that are provided by social media applications for inclusion in the web pages and news articles. The method injects code for analyzing the determined type of web object in a web frame that is used to retrieve the web object The method determines a desired width for rendering the document based on the device screen size, resolution, and orientation. The method provides the width to the injected code. The method requests the web content retriever to retrieve the web object from a content provider. For each component of the web object, the method receives a first message from the code inserted in the corresponding web frame indicating that the web object includes the component. For each component of the web object that is fully retrieved, the method receives a second message from the code inserted in the corresponding web frame. The second message includes the height of the component and an indication that the component is fully retrieved. The method then determines a layout for the document by using the height of the last retrieved component of the web object.

One of ordinary skill will realize that the preceding Summary is intended to serve as a brief introduction to some inventive features of some embodiments. Moreover, this Summary is not meant to be an introduction or overview of all-inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF DRAWINGS

The novel features of the invention are set forth in the appended claims. However, for purposes of explanation, several embodiments of the invention are set forth in the following figures.

DETAILED DESCRIPTION

Figure 1:
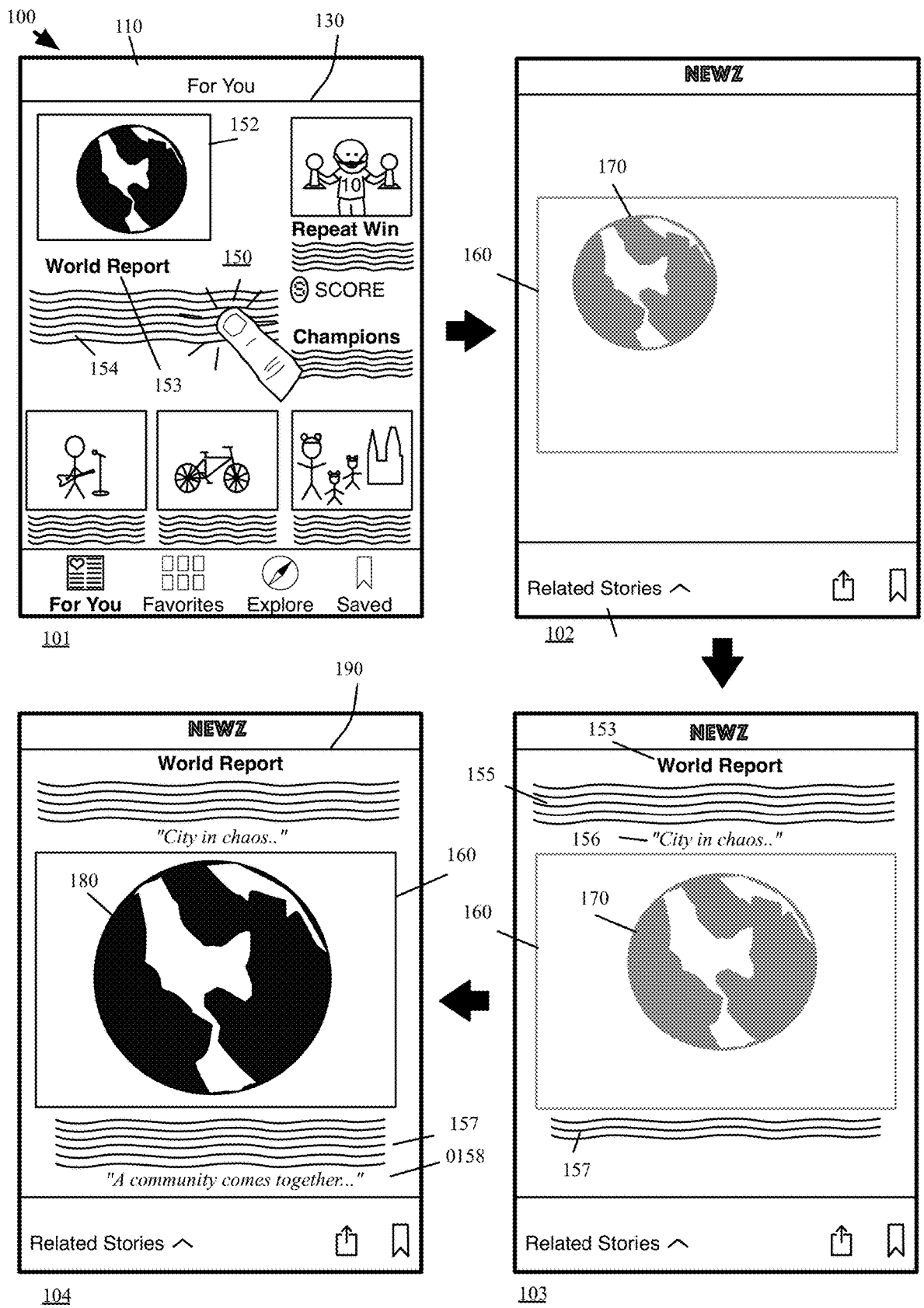
FIG. 1 conceptually illustrates an example of layout generation and rendering of an article selected from an article summary page in some embodiments.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a layout generator that ensures an electronic document's content is presented in a visually pleasing manner. In some embodiments, the layout generator in a client device enforces its own set of design rules based on the client device's display size, resolution, and orientation. Different embodiments provide novel methods to facilitate generation of layouts and rendering of electronic documents.

In some embodiments, an electronic document is selected from a summary page that displays summaries of several documents. A two-pass process is then used to determine a layout of the selected electronic document. In the first pass, an image of the selected document that is displayed in the summary page is identified and the end of the image is marked as a target location for doing a partial layout. A partial layout, which includes a location for rendering the image, is then determined. This partial layout includes document components from the beginning of the document up to and including the end of the identified image. The image is then animated to the determined location.

In the second pass, while the image is being rendered, a full layout for the document is determined. The full layout is generated to include the rest of the document from the target point to the end of the document. In some embodiments, rendering of the document is also started based on the partial layout while the image is being animated.

Some embodiments provide a method that determines a location for placing an advertisement on an electronic document. The method determines a layout to render the electronic document based on different criteria such as size, orientation, and resolution of a device display screen. The method then determines a location in the document layout to display the advertisement. The method identifies a region in the layout adjacent to the location identified for the advertisement. The method then adjusts the identified region in the layout to place the advertisement on the document without changing the rest of the layout.

Some embodiments provide a method for determining a layout for an electronic document that includes a web object. The web object is retrieved from a content provider. The method inserts code, for analyzing a determined type of web object, in each web frame that is used to retrieve one of the web object's components. For each component of the web object, the corresponding inserted code sends a message to the layout generator indicating that the web object includes the component. When a component of the web object is fully retrieved, the inserted code sends another message to the layout generator to provide the height of the component and indicate that the component is retrieved.

Several more detailed embodiments of the invention are described below. Section I describes a multi-pass process for determining a layout for an electronic document. Section II describes an efficient process for placing an advertisement on an electronic document. Section III describes a method for determining a layout for an electronic document that includes a web object. Finally, Section IV describes an electronic system with which some embodiments of the invention are implemented.

I. Multi-Pass Process for Determining a Layout for an Electronic Document

Some embodiments display a summary page for a set of electronic documents such as web pages or articles on a device display screen. After one of the articles in the summary page is selected, a layout generator determines a layout for displaying the full article. In order to ensure that an electronic document's content is presented in a visually pleasing and professional manner, the layout generator determines a layout based on the client device's display size, resolution, and orientation. The layout generator also considers other factors such as the size and type (e.g., image, text, video, fonts, etc.) of different components of the document to dynamically generate the layout.

The layout generator may further modify properties of a component of the document based on applicable rules. Such modifications can include alterations to font, font size, width, position, color, or other properties and attributes of the component. The layout generator also considers the order of different components of the document for generating the layout. For instance, the layout generator may receive a sorted list of the positions and sizes of different components of the document and use the list to determine the layout. The layout generator may further identify a cropping method for different components of the document.

For a long document with many components, performing the above-mentioned steps to determine the layout may cause a delay between selecting the document from the summary page and determining the layout for rendering the document. Some embodiments utilize a novel two-pass process to display an image animation while the document layout is being generated. These embodiments determine a portion of the layout that includes the location of an image in the layout. The image is then animated and the rest of the layout is determined while the animation is being performed.

FIG. 1 conceptually illustrates an example of layout generation and rendering of an article selected from an article summary page in some embodiments. The figure is shown in four stages 101-104. Stage 101 shows GUI 100 that displays a news article summary page. The summary page includes a status bar 110 and a summary page (or news feed) layout 130. The status bar 110 displays a name for the feed. The news feed shows summaries of several articles including the summary for article 150.

In the first stage 101, a user selects article 150 from the summary page 130. The article summary in this example includes title 153, image 152, and excerpt text 154. As shown in stage 102, a region in the screen is identified (as conceptually illustrated by the box 160) and image 152 of article in the summary page 130 is animating (as shown by 170) within the identified region. In some embodiments, the image is animated from the location of image 152 to the region 160. In other embodiments, the image is animated from a different location (e.g., from within region 160) and grows inside region 160. In addition, some embodiments re-crop the image to expose portions of the image that were previously cropped to fit the image to the layout of the summary page.

In stage 103, while the image 170 is being animated, a portion of the article is rendered in the GUI display area. The displayed portion includes the title 153, text 155 and 157, and quote text 156. In stage 104, the article is rendered in the full article view 190. In this stage, image is rendered to its full size 180 and text 157 is completed. In addition, another quote text 158 is displayed in the full article view 190. The document may have several other components that do not fit in the display screen and are displayed only when the article is scrolled down.

Transition from the summary page layout 130 to full article layout 190 may include other actions such as the summary text of the article or summaries of other articles being faded out while the image is being animated. These actions are not shown in FIG. 1 for simplicity.

Figure 2:
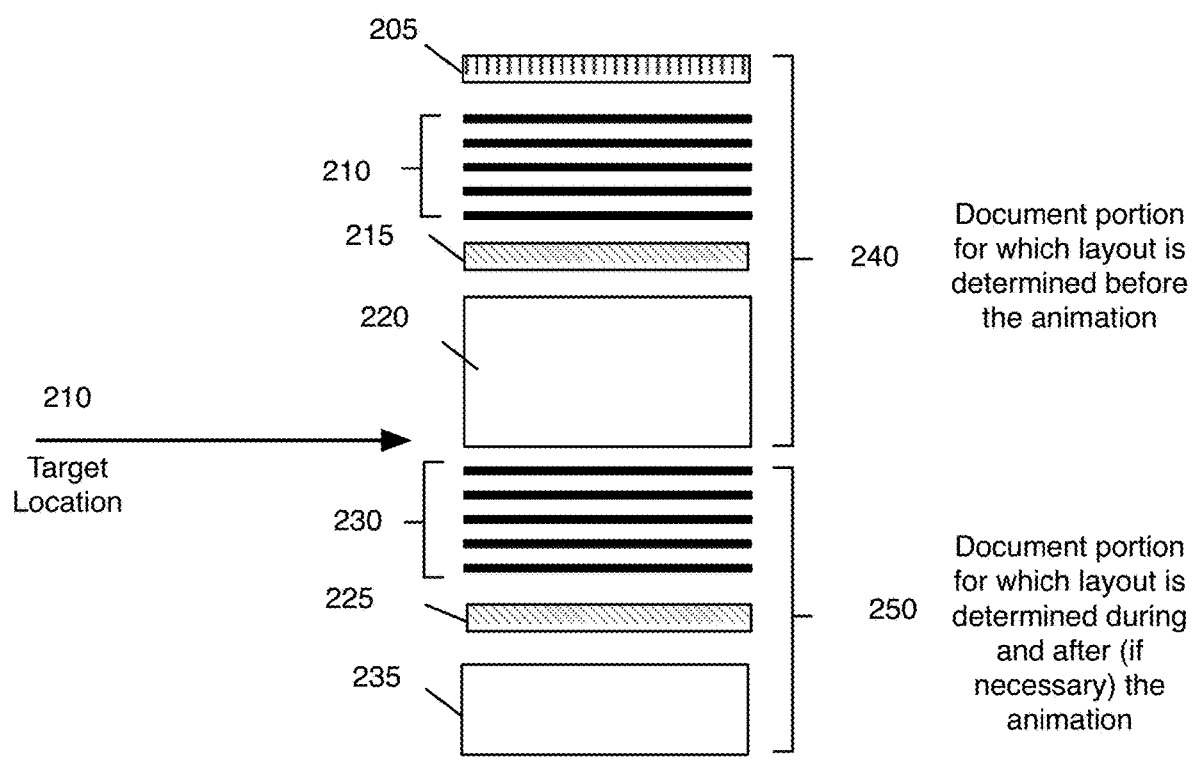
FIG. 2 conceptually illustrates different components of an electronic document in some embodiments.

FIG. 2 conceptually illustrates different components of an electronic document in some embodiments. In this example, the document includes a title 205, text 210 and 230, two images 220 and 235, and two quote text 215 and 225. Image 220 is an image (such as image 152 in FIG. 1) that is displayed in the summary page.

Image 220 is identified in the document as an image that is included in the article summary. The end 210 of this image is marked as a target location for doing a partial layout for the document. A partial layout is then generated for the document portion 240. This portion includes the document components from the beginning of the document up to and including image 220. The layout generator may receive a sorted list of the positions and sizes of different components of the document and use the list to determine the layout.

Once the location of image 220 is identified in the layout, the image is animated from the location of the image in the document summary into the identified location. For instance, the image 152 in FIG. 1 is animated from the location of the image in the summary page 130 to the location 160 of the image in the full document view 190.

While image 220 is being animated, the layout for the rest of the document is determined. This portion 250 of the document starts after the image 220 and extends to the end of the document. Some embodiments also start rendering the first portion 240 of the document (e.g., as shown in stage 103 in FIG. 1) while image 220 is being animated. Other embodiments start rendering the document after the full layout is determined.

Figure 3:
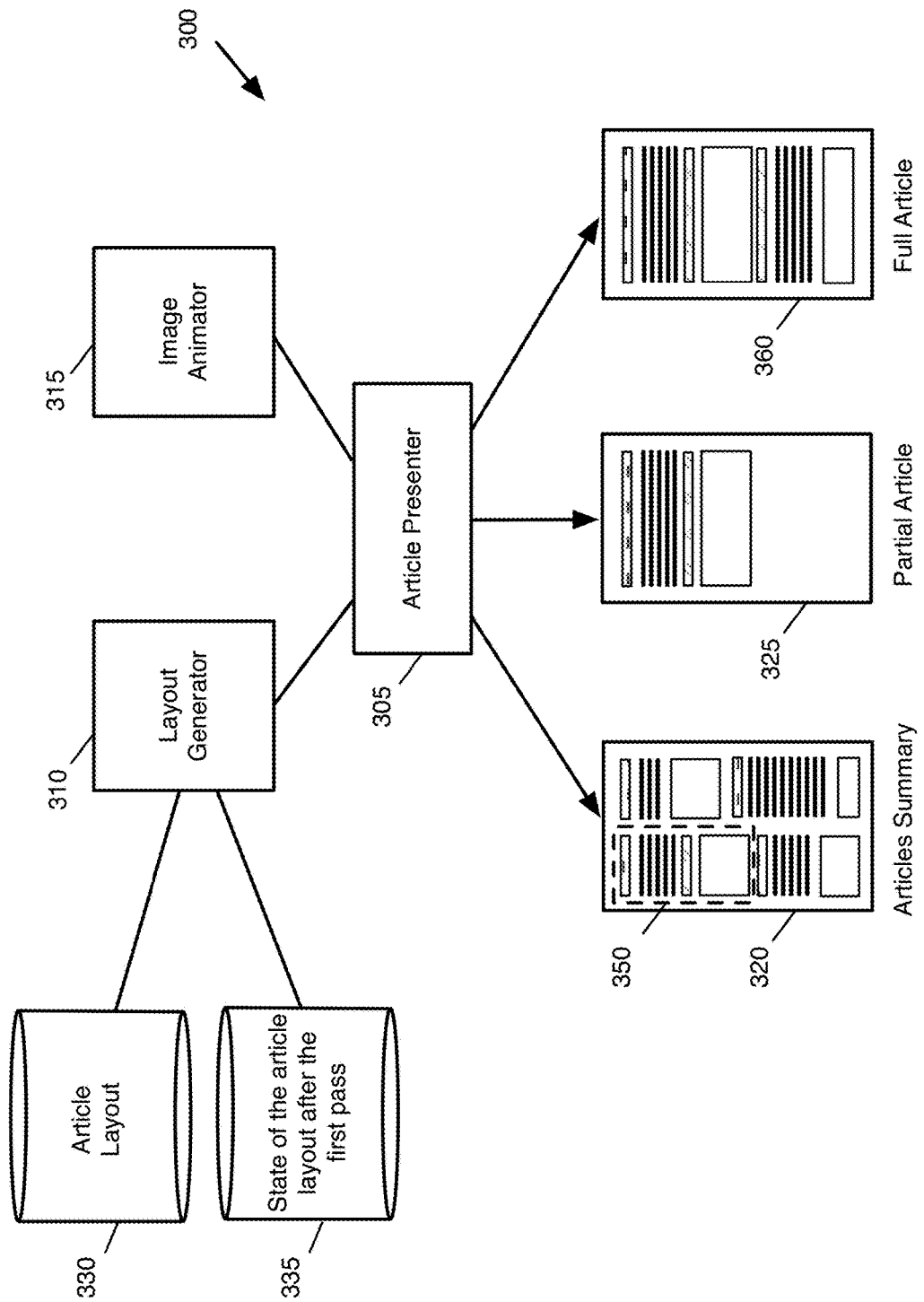
FIG. 3 conceptually illustrates different components of a document viewing application of some embodiments that allows a user to browse a group of documents, select a document, and review the selected document.

FIG. 3 conceptually illustrates different components of a document viewing application 300 of some embodiments that allows a user to browse a selection of documents (e.g., an article summary), select a document, and review the selected document. The document viewing application includes different components for determining the layout and rendering an electronic document such as an article or a web page in some embodiments. The document viewing application in some embodiments executes on a client device, which is an electronic device such as a smart phone, a touchpad, a mobile device, a computer, etc.

The figure shows an article presenter 305, a layout generator 310, and an image animator 315. The article presenter 305 receives a selection of an article 350 displayed in an article summary page 320. For instance, article presenter receives a selection of article 150 when a user selects article 150 from summary page 130 in FIG. 1.

The article presenter then activates layout generator 310 to perform a first pass and determine a partial article layout. The first pass identifies an image that is displayed in the article summary page and determines the location of the image in the full article view. The state of the article layout after the first pass is stored in a file 335.

The article presenter then passes the image information to image animator 315 to animate the image to the location of the image in the full article view. For instance, the image animator may determine different sets of image attributes such as image size, image, coordinates, image color and brightness, etc. The sets of attributes are then used to render the image animation, e.g., at a different location on the device display. The image may also be animated to a different size, color, and/or brightness.

While the image is being animated, article presenter activates layout generator again. The layout generator uses the stored state 335 of the article layout after the first pass to continue determining the rest of the article layout in a second pass. The article layout is stored in a file 330. In some embodiments, while the image is being animated, the article presenter starts rendering the article (as shown by the partial article 325) using the portion of the layout that was determined in the first pass. Once the full article layout is determined the article presenter renders the full article 360.

Figure 4:
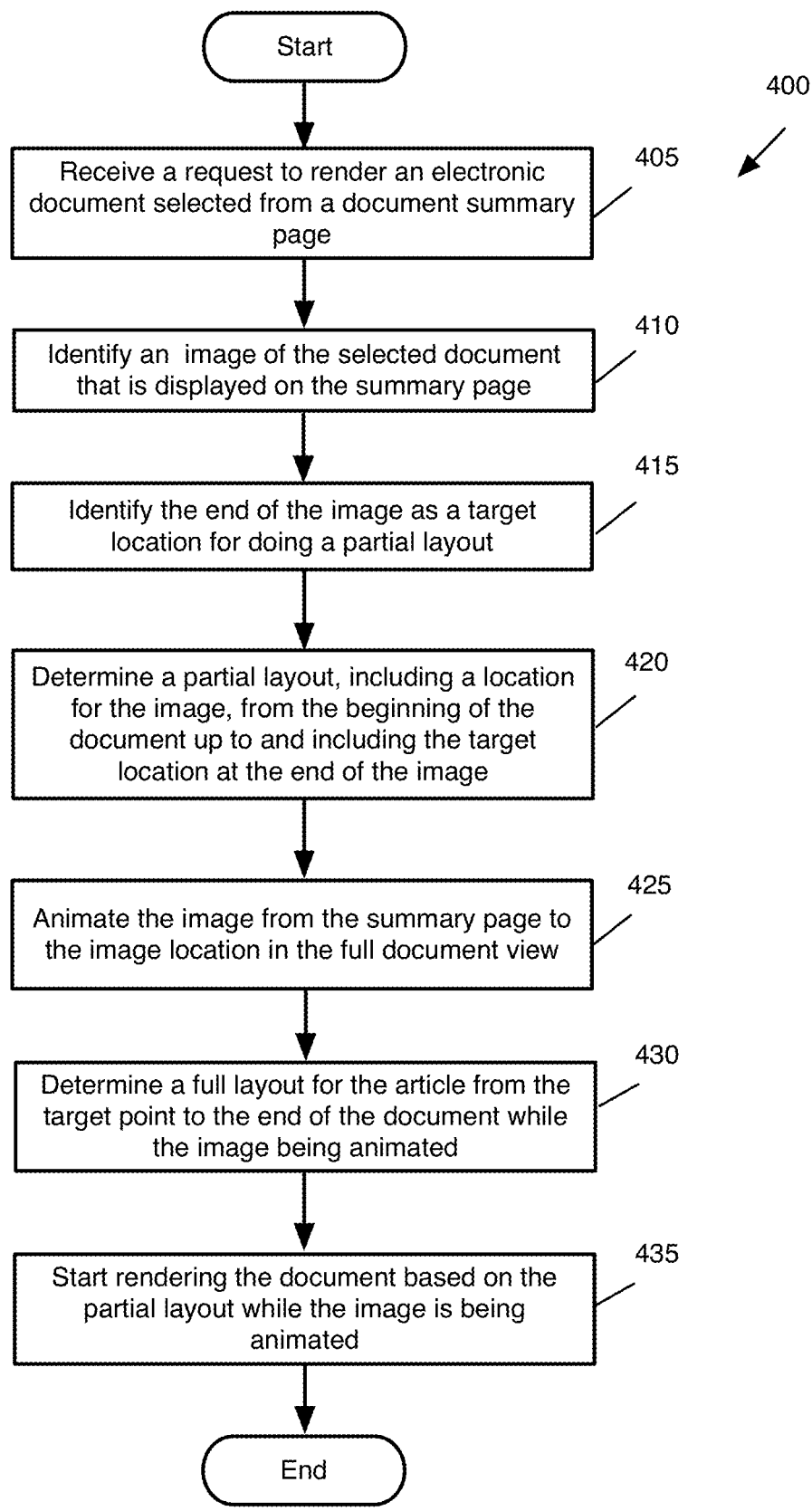
FIG. 4 conceptually illustrates a process for determining the layout of an electronic document in some embodiments.

FIG. 4 conceptually illustrates a process 400 for determining the layout of an electronic document in some embodiments. The process in some embodiments is performed by a document viewing application such as document viewing application 300 in FIG. 3. As shown, the process receives (at 405) a request to render an electronic document selected from a document summary list. For instance, the process receives a selection of article 150 from the article summary page (or feed) 130 shown in FIG. 1.

Next, the process identifies (at 410) an image of the document that is displayed in the document summary page. For instance, the process identifies image 152 that is displayed on the article summary page 130. The process then identifies (at 415) the end of the image as a target location for doing a partial layout for the document. For instance, the process identifies the end 210 of image 220 as a target location as shown in FIG. 2.

The process then determines (at 420) a partial layout, including a location for the image, from the beginning of the document up to and including the target location at the end of the image. For instance, the process determines a partial layout that includes the location 160 of the image in the layout.

Next, the process animates (425) the image to the determined location of the image in the full document view. For instance, the process animates image 170 from the article summary page 130 to the image location 160 in the full article page 190.

The process then determines (at 430) a full layout for the article from the target point to the end of the document while the image is animated. For instance, the process determines a layout to render the article in a full article view 190. The process utilizes the partial layout and completes the layout from the target location to the end of the document. The process then starts (at 435) rendering the document based on the partial layout while the article is being animated. For instance, as shown in stage 103 in FIG. 1, the process start rendering the title 153, text 155, and text quote 156 while the image 170 is being animated. The process then ends.

II. Efficient Process for Displaying an Advertisement on an Electronic Document

Figure 5:
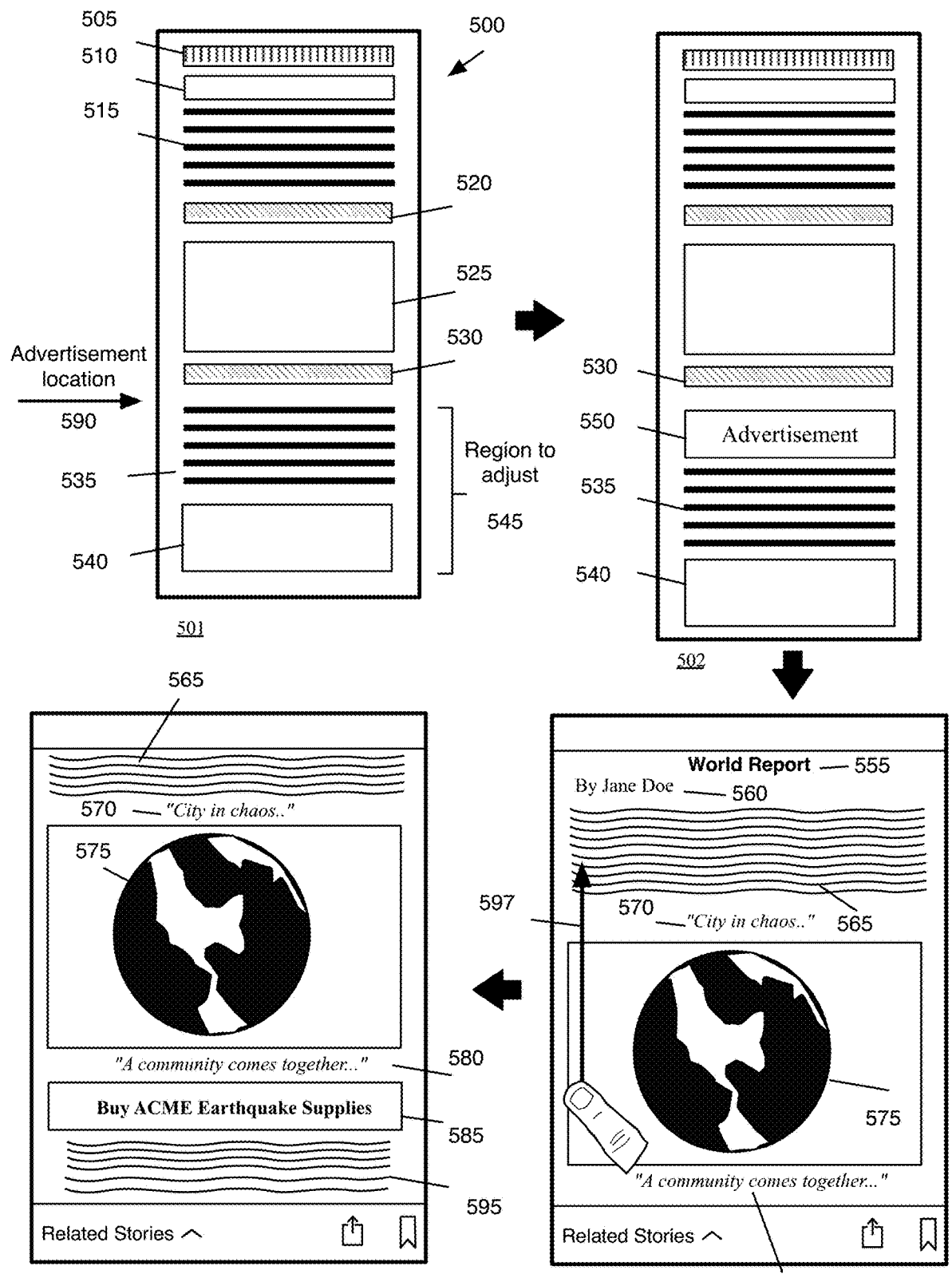
FIG. 5 conceptually illustrates determining a location for placing an advertisement on an electronic document in some embodiments.

Some embodiments provide a method that determines a location for placing an advertisement on an electronic document. FIG. 5 conceptually illustrates determining a location for placing an advertisement on an electronic document in some embodiments. The figure is shown in four stages 501-504.

In stage 501, a document layout 500 is generated by a layout generator application. Although the layout is shown as a sequential arrangement of document components, the layout generator specifies the layout using a set of coordinates, sizes, and parameters for different components of the document. The layout in some embodiments is dynamically generated based on the size, orientation, and resolution of a device display screen as well as the number and properties of different components of the documents.

As shown in stage 501, the layout generator has generated a layout for different components of the document such as title 505, author 510, text 515 and 535, text quote 520 and 530, and images (such as pictures, videos) 525 and 540. In stage 501, the layout generator application also determines a location 590 for placing an advertisement in the document.

Figure 6:
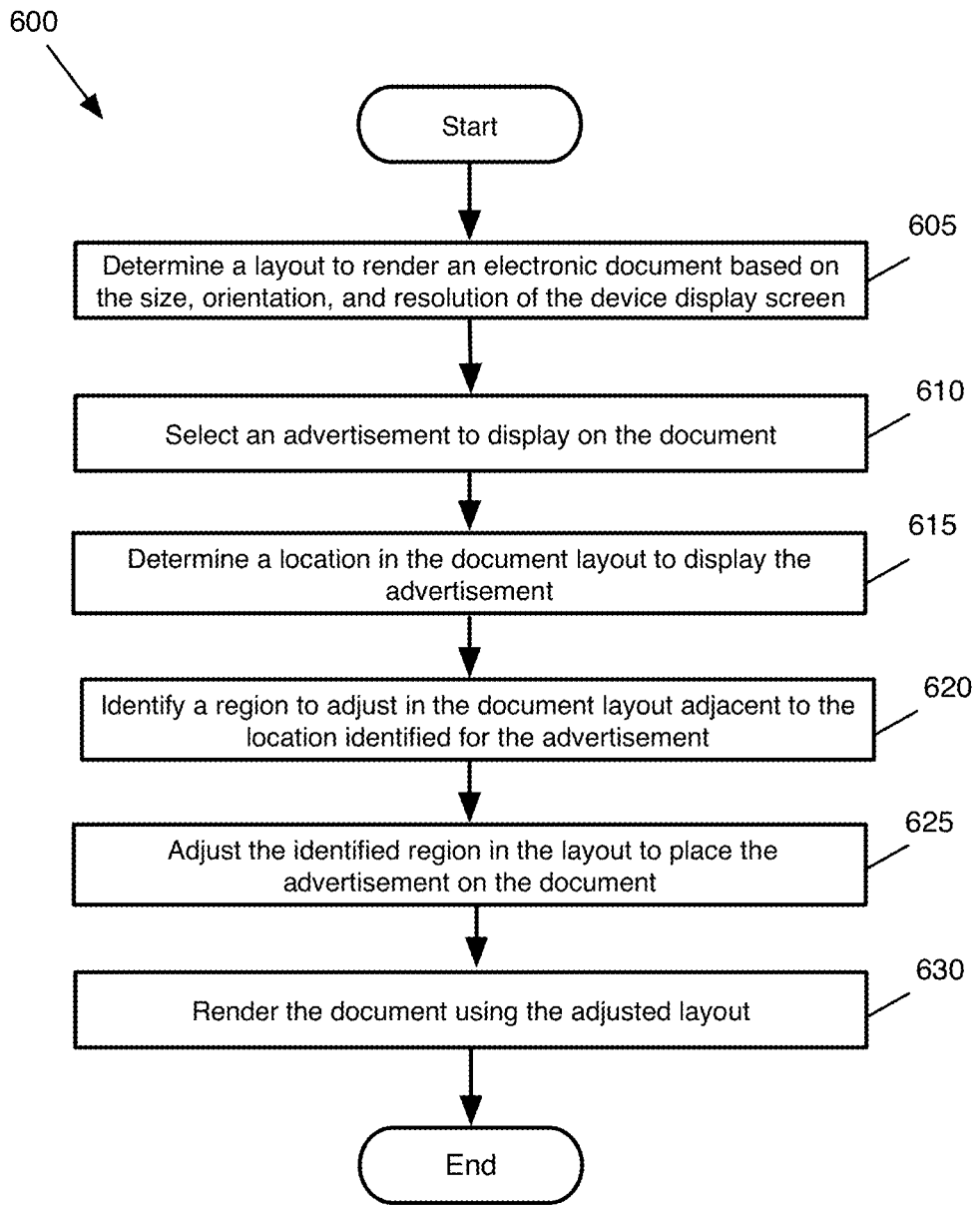
FIG. 6 conceptually illustrates a process for placing an advertisement on an electronic document in some embodiments.

FIG. 6 conceptually illustrates a process 600 for placing an advertisement on an electronic document in some embodiments. The process in some embodiments is performed by a layout generator application such as layout generator 310 in FIG. 3. As shown, the process determines (at 605) a layout to render an electronic document (e.g., an article or a web page) based on the size, orientation, and resolution of the device display screen as well as the number and properties of different components of the documents. For instance, the process determines layout 500 for the document as shown in FIG. 5.

The process then selects (at 610) an advertisement to place on the document. The process then determines (at 615) a location in the document layout to display the advertisement. The layout generator in some embodiments uses a set of rules to place an advertisement on an electronic document. In these embodiments, the layout generator first determines a layout for the document without the advertisement. The layout generator then uses the rules to select a location for placing the advertisement. The advertisement, in some embodiments, is a full width advertisement.

In some embodiments, an advertisement can be placed between two components in the body of a document but not in the first viewport and not if another planned advertisement component is within the same viewport. A viewport is the part of a displayed page that the user can currently see. The first viewport is the portion of the document that the user can see after the document is rendered on the display screen of a device. The user can then scroll to show other parts of the document.

An advertisement can also be placed between two containers but not in the first viewport and not if another planned advertisement is within the same viewport. A container is a portion of a document (such as the header) that includes several components. For instance, the header may include the tile superimposed over an image. The tile and the image are placed in a container in order to be rendered together.

An advertisement can also be placed as a last component inside a document or a container even if the end of the document is within the first viewport. The advertisements are not placed immediately after or before an image in the same scope (i.e., the same document or container). Some embodiments also do not place advertisements between anchored components. Anchored components in some embodiments act as links to allow a specific location in the current document or another document to be displayed.

Process 600 then identifies (at 620) a region to adjust in the document layout adjacent to the location identified for the advertisement. As shown in FIG. 5, the advertisement location 590 is identified in the layout 500. A region 545 in the layout 500 is then identified to adjust in order to place the advertisement in the document.

Process 600 then adjusts (at 625) the identified region in the layout to place the advertisement on the document. As shown in stage 502 in FIG. 5, text 535 and image 540 are adjusted (e.g., reshaped, moved around, etc.) to make room for the advertisement 550. Although the layout is conceptually illustrated as a sequential series of components, the actual layout is determined based on the two-dimensional size and orientation of the device display screen where several components may be horizontally or vertically adjacent or several components of the documents may be overplayed (e.g., the components in a container).

Referring back to FIG. 6, the process then renders (at 630) the document using the adjusted layout. As shown in stage 503 in FIG. 5, the document is rendered and a portion of the document that includes title 555, author 560, text 565, quote text 570, image 575, and quote text 580 is displayed. In this stage the advertisement is not displayed on the display screen in the first viewport. However, in other examples, the advertisement may be displayed the first time the document is rendered on the screen.

As shown by arrow 597 in stage 503, the user is scrolling the document down. In stage 504 the tile, author, and a portion of text 565 are scrolled out of the screen and the advertisement 585 and a portion of text 595 are displayed in the screen.

III. Determining Layout for an Electronic Document that Includes a Web Object

Electronic documents include different components such as title, author, text, images, videos, links, text quotes, audios, etc. The document publisher (e.g., the publisher of a news article) provides a description of each component of the document. The description can be provided in the form of metadata or in the form of document definition. The document definition in some embodiments is received in the form of a document definition (or content presentation) structure. As described further below, when the document includes a web object (such as Twitter cards, Facebook posts, Vine videos, Instagram photos, etc.) the document definition structure does not include any information about the size of the web object or the size of the components of the web object.

In some embodiments, a layout generator application dynamically generates the article layout for display on a device. For instance, in some embodiments, the layout generator application dynamically defines the layout of the document after receiving the document definition for generating the document display.

The publisher of a document in some embodiments produces the document content in the form of content definition structure and delivers the content to a content delivery system (e.g., the document viewing application 300 in FIG. 3). A content definition structure facilitates content presentation by placing authored contents in structures that can be manipulated and styled for subsequent presentation. For example, in some embodiments, the content is that of a news article, whose text and images are authored or furnished by a publisher. Those authored text and images are placed in component structures of the content definition structure, upon which additional formatting and styling information can be flexibly applied or specified. In some embodiments, these additional formatting and styling information are added into the content presentation structure and can be subsequently modified or further enhanced.

The presentation of the content can include text, images, animation, audio, video, multimedia, braille, or other types of visual, auditory, or other sensory experiences that can be made by a computing device. The presentation of the content also includes behaviors exhibited by various components as specified by the content presentation structure.

In some embodiments, a content definition structure is written in a content presentation structure language (CPSL). In some embodiments, the CPSL leverages the constructs and syntax of JavaScript Open Notation (JSON) language. In some embodiments, a content presentation structure written in such a CPSL is considered a "native document" to the content delivery system as the syntax of the CPSL is optimized to utilize the inherent capabilities of the system.

Figure 7:
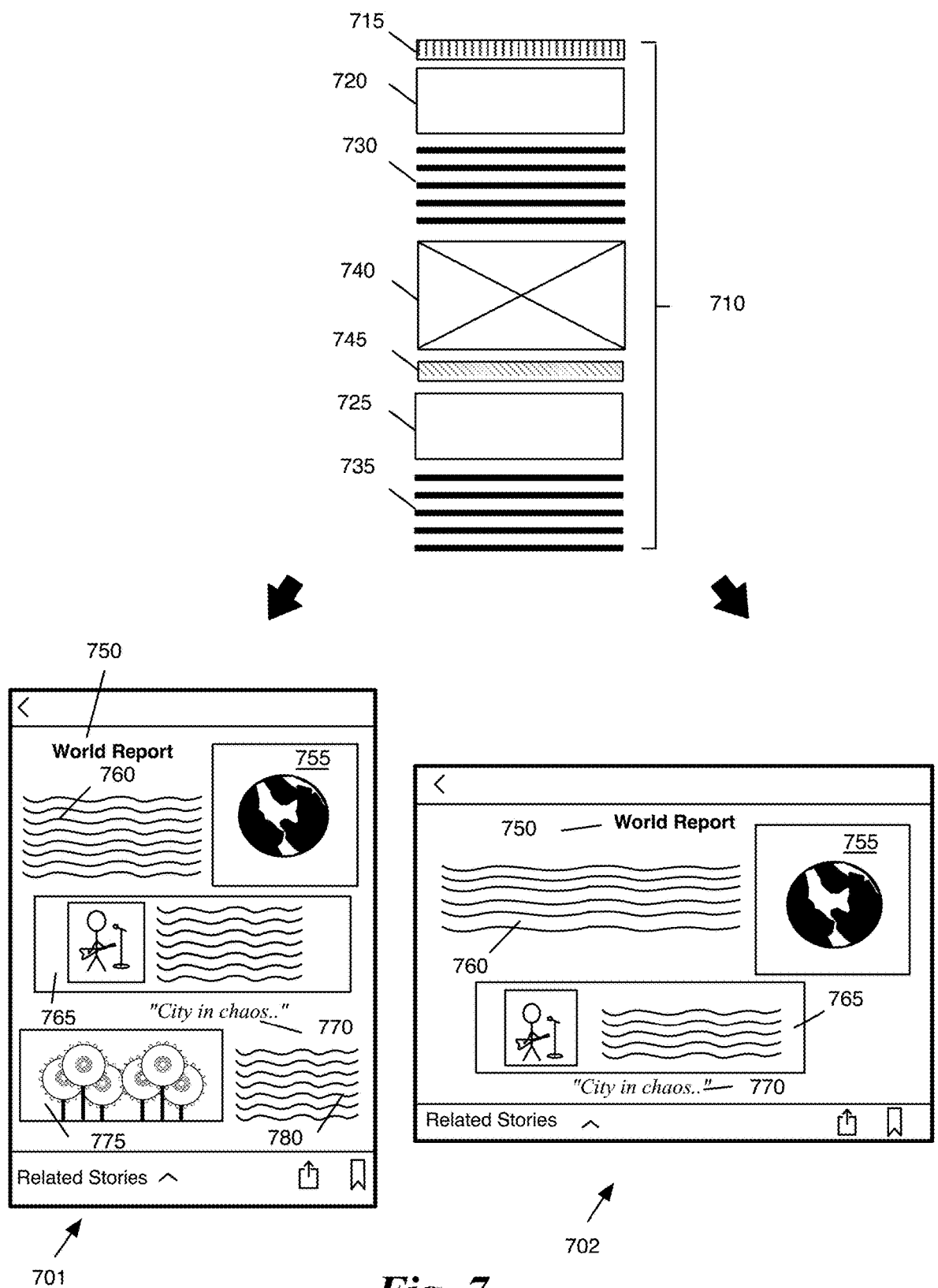
FIG. 7 conceptually illustrates dynamic layout generation in some embodiments.

FIG. 7 conceptually illustrates dynamic layout generation in some embodiments. As shown, document 710 (e.g., a news article) includes several components 715-745. The document components in this example include title 715, images 720-725, text 730-735, quote text 745, and a web object 740. Examples of web objects include different objects such as Twitter cards, Facebook posts, Vine videos, Instagram photos, etc. Web objects are provided by social media applications or news websites for inclusion in the web pages and news articles.

The layout generator determines a layout for rendering the document based on the size, orientation, and resolution of the device display screen. For instance, in the example of FIG. 7, the layout generator has generated two different layouts for the same article based on the orientation of the device. When the device is in portrait orientation 701, the article rendered uses a layout that displays title 750, image 755, text 760, web object 765, quote text 770, image 775, and text 780. When the device is in landscape orientation 702, the article is rendered using a different layout that shows text 760 and web object 765 with different height and width than the portrait orientation 701. In landscape orientation, image 775 and text 780 are not displayed in the first viewport and the user has to scroll the document in order to see image and text.

The content presentation structure received from a publisher specifies the components' layout in coarse terms (e.g., columns instead of display pixels or points), and only in terms of relative position and, in some embodiments width, but not height. It is up to the client device to determine the actual size, shape, and position of the components in a layout operation based on its own device-specific design rules.

In some embodiments, the layout generator application on client device determines the shape, size, and position of each component (such as title, author, text, video, image, quote text, etc.) based on information in the document definition structure and finalizes the layout of the components in a blueprint. Each component has a corresponding layout. Web objects (such as Twitter cards or Facebook posts, etc.) on the other hand, are included in the document definition structure without any information about the size of the web object or the size of the individual components of the object. The layout generator, therefore, is not able to use the document definition structure provided by the document publisher to determine the size and components of a web object in order to generate the layout. The size of individual components as well as the overall size of a web object can only be determined after the web object is retrieved from a content server.

Figure 8:
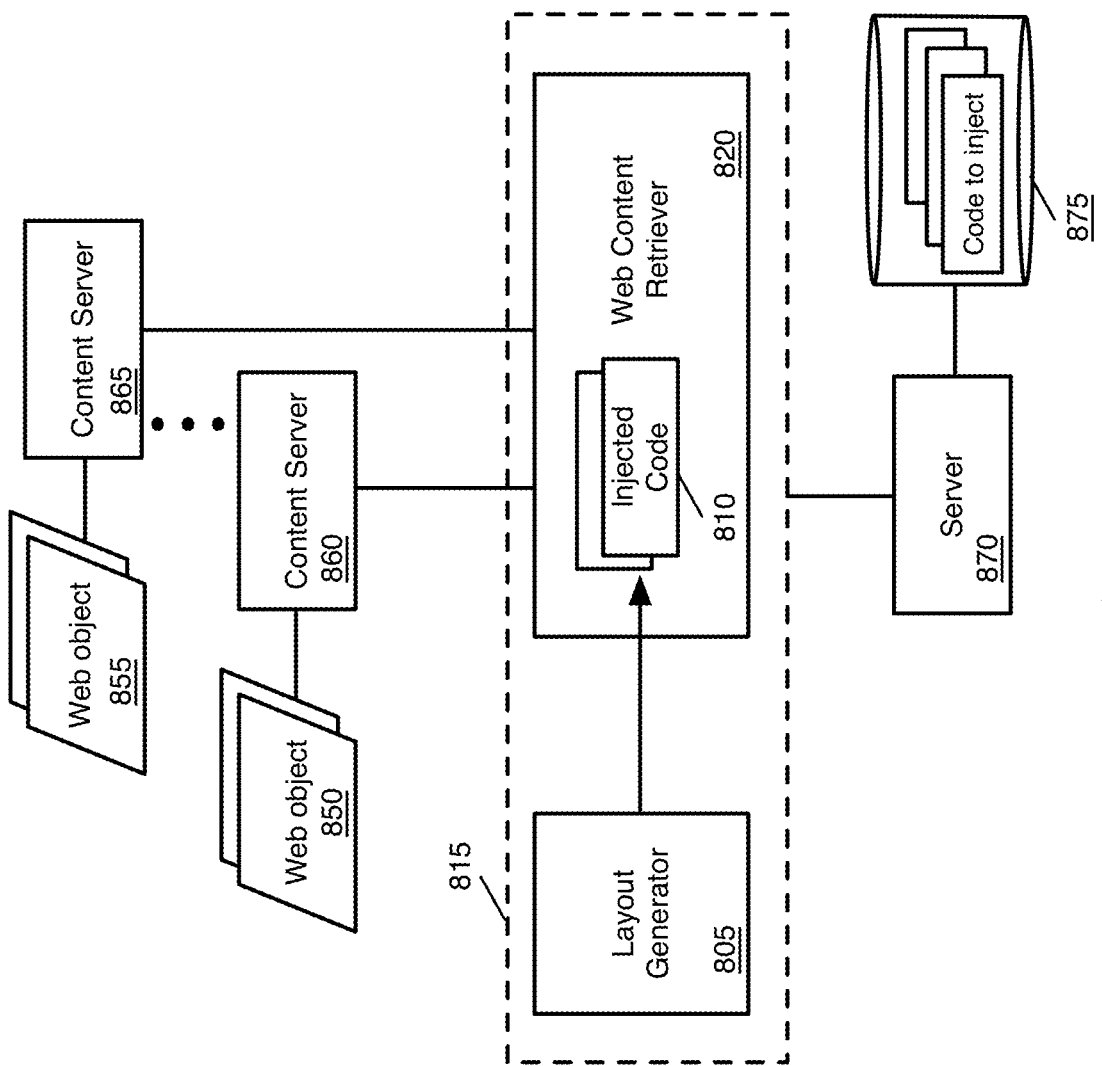
FIG. 8 conceptually illustrates a layout generator application that retrieves a web object in some embodiments.

FIG. 8 conceptually illustrates a layout generator application that retrieves a web object in some embodiments. The layout generator application 805 may be a part of a document viewing application (such as document viewing application 300 in FIG. 3) that allows a user to browse a selection of documents (e.g., an article summary), select a document, and review the selected document.

Applications developed for a device (such as mobile device, smart phone, touchpad, laptop, computer, etc.) can be categorized into native, hybrid, and web applications. A native application can use the native capabilities of a device (such as speaker, GPS, etc.) as well as the operating system with minimum performance overhead on a given platform. A native application has to be developed for each device platform.

A web application, on the other hand, is portable across different platforms and saves development time and cost. Web applications are typically prevented from accessing a device's native capabilities. A hybrid application can be developed using web technologies. The hybrid application is wrapped in a thin platform-specific container or shell that allows the hybrid application to be installed just like a native application. Similar to native applications, a hybrid application can be distributed through the device's "app store."

In some embodiments, the layout generator application 805 is developed as a native application. As shown, layout generator application 805 uses a web content retriever application 820 to retrieve web objects 850-855. Web content retriever in some embodiments is an embedded function bundle that acts as an embedded browser. An example of such an embedded function bundle is WebView. In order for layout generator application to use both the native capabilities of the device and use web content retriever to use web technologies to retrieve web objects, some embodiments wrap the layout generator 805 and web content retriever 820 in a platform-specific container (or shell) 815 that allows the layout generator and web content retriever to be installed like a native application.

Figure 9:
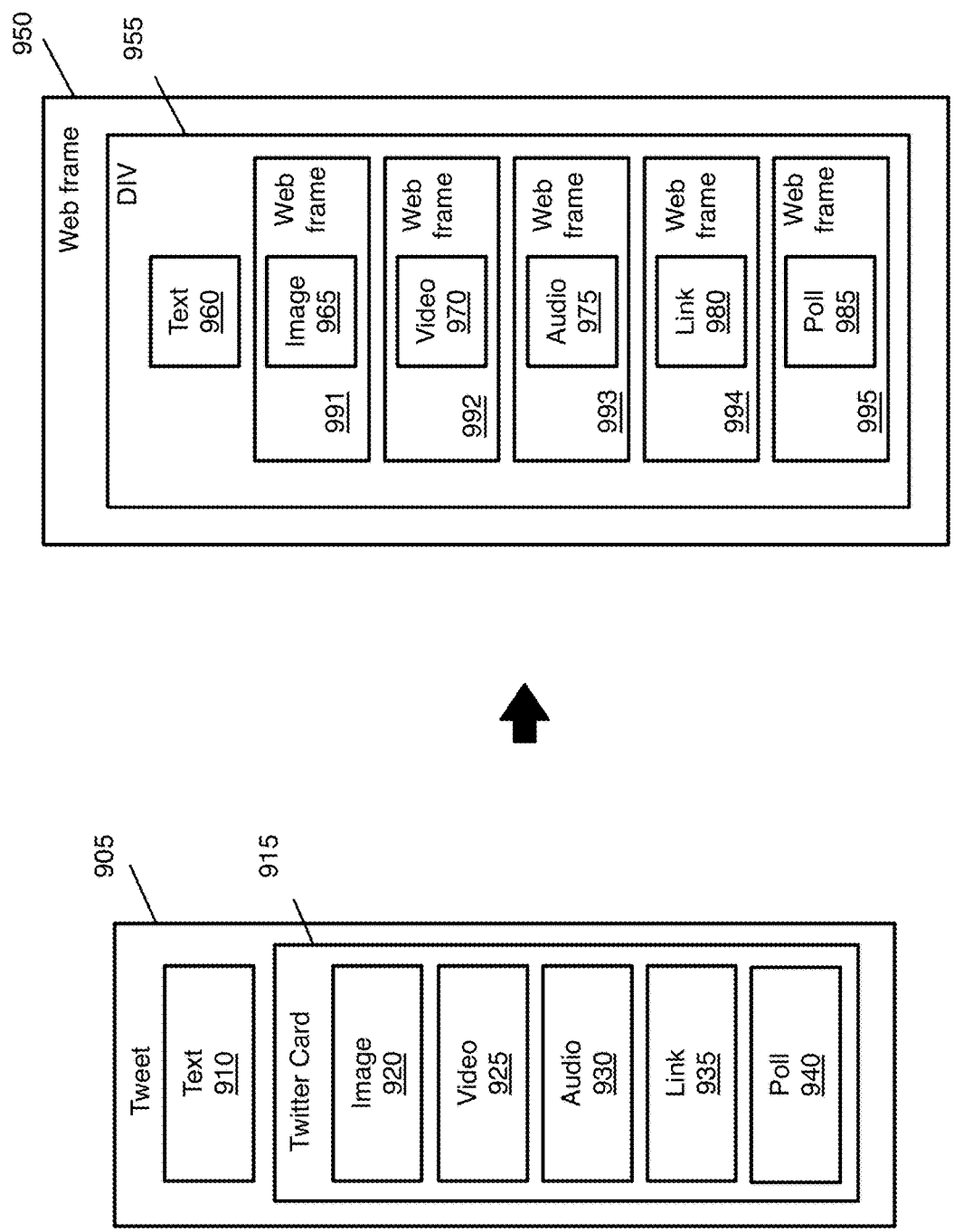
FIG. 9 conceptually illustrates a web object provided by a social networking server.

The web objects 850-855 are downloaded from one or more content servers 860-865, e.g. in hypertext markup language (HTML) format. Different types of web objects such as Twitter card or Facebook post are provided by different content providers and have to be retrieved from a different content server. FIG. 9 conceptually illustrates a web object 905 provided by a social networking server. The web object in this example is a Twitter object (a Tweet) that includes text 910 and a card 915. The text 910 in a Twitter object may include up to a predetermined number of characters (e.g., 140 characters). The Twitter object, however, can include a card 915 that has one or more images 920, videos 925, audios 930, downloaded links 935, polls 940, etc. The length of a twitter card depends on the content of the card and is not included in the document definition structure of an article (such as document 710 in FIG. 7) that is provided by the article publisher.

The web content retriever 820 (shown in FIG. 8) retrieves and provides a web object such as the web object 905 of FIG. 9 as a web frame (such as an inline frame or iframe) 950 in some embodiments. An iframe places another HTML document in a frame. Social networking providers such as Twitter and Facebook utilize web frames to provide content to third party websites or applications such as layout generator application 805 or web content retriever 820. The "div" element 955 is an HTML tag that encapsulates other elements and divides an HTML document into sections. In this example, the twitter card 915 is placed inside a div element 955 of web frame 950.

Each component of the web object 905 is included as another web frame inside web frame 950. For instance, image 965 is included in web frame 991, video 970 is included in web frame 992, audio 975 is included in web frame 993, link 980 is included in web frame 994, poll 985 is included in web frame 995, and so on.

Referring back to FIG. 8, layout generator 805 requests the web content retriever 820 to retrieve (or download) the web objects 850-855 from the content servers 860-865. The web content retriever 820, however, follows web protocols to download the web objects and the layout generator has no way of knowing when a web object is fully retrieved.

The layout generator 805 in some embodiments injects code (e.g., JavaScript code) into each of the web frames (e.g., web frames 950 and 991-995 in FIG. 9) used by web content retriever 820 to retrieve different components of a web object. For each type of web object, the layout generator injects code that is custom make for analyzing that type of web object. The layout generator 805 in some embodiments retrieves the required injected code for each type of web object from a server 870 that stores and distributes the codes to inject 875. In some embodiments, the document viewing application retrieves the required injected codes (e.g., once an article that requires a particular type of web object is received from a publisher) and locally stores the injected code in the client device that executes the layout generator.

The injected code 810 in each web frame analyzes the contents of the web frame as the content is retrieved from the corresponding content server and sends messages to the layout generator to mark the start and end of downloading of each web object component. The injected code also receives the width of the document to be rendered from the layout generator and determines the height of the corresponding web object component. As each web frame is fully retrieved, the injected code in the web frame provides the height of content in the web frame to the layout generator.

Figure 10:
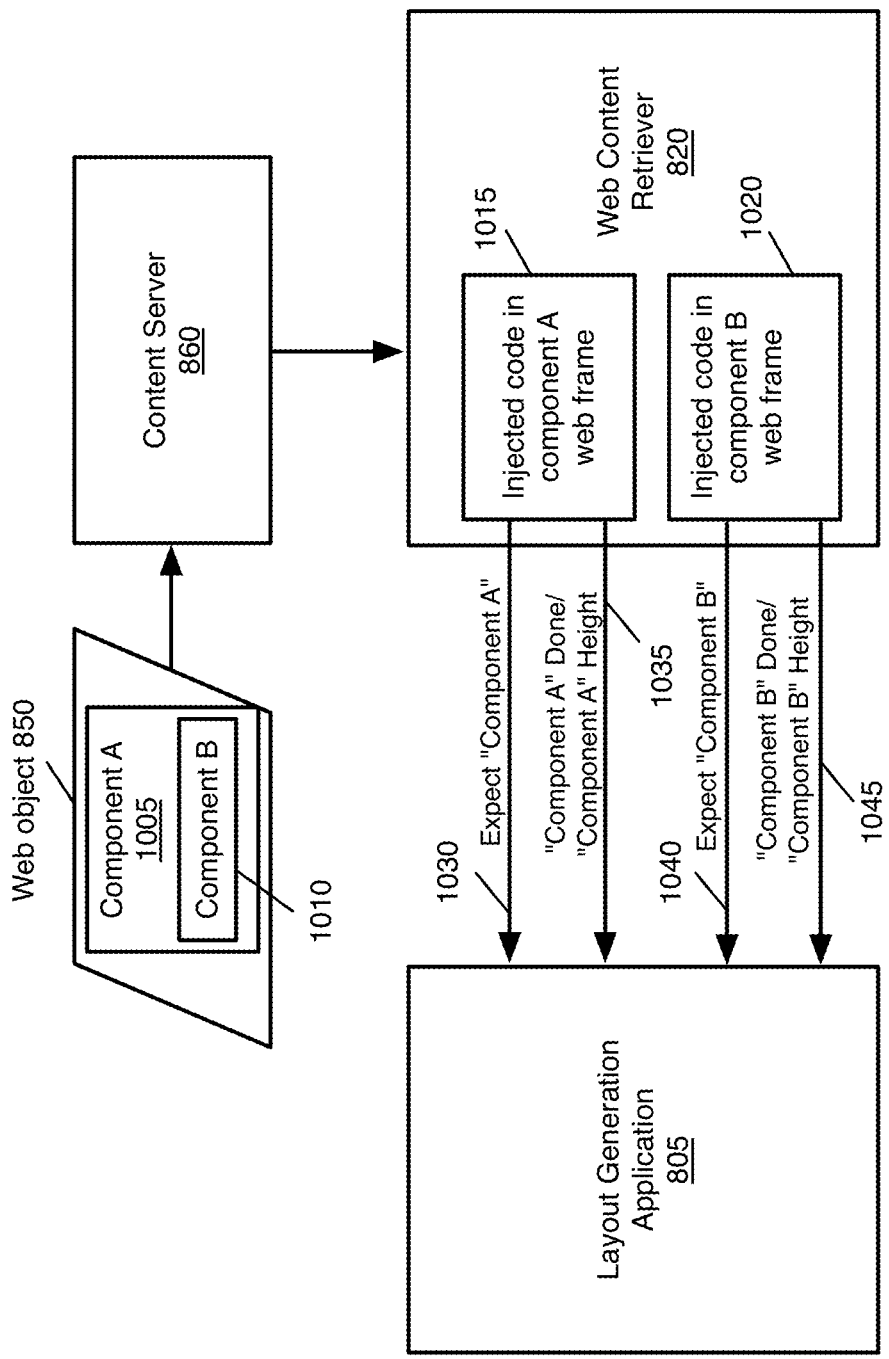
FIG. 10 conceptually illustrates the messages that are exchanged between a layout generator application and the codes that are injected in web frames which are used to retrieve different components of one of the web objects of FIG. 8.

FIG. 10 conceptually illustrates the messages that are exchanged between a layout generator application and the code snippets that are injected in web frames which are used to retrieve different components of one of the web objects 850-855 of FIG. 8.

As shown, web object 850 in this example includes two components. For instance, components A 1005 can be a tweet such as tweet 905 in FIG. 9 and component B 1010 can be a card 915. Other possible components of a tweet are not shown for simplicity. As shown, layout generator has injected code 1015 in the web frame that is used to retrieve component A 1005 of web object 850. Layout generator has also injected code 1020 in the web frame that is used to retrieve component B 1020 of web object 850.

When the web content retriever 820 starts receiving component A 1005 from content server 860, injected code 1015 sends a message 1030 to layout generator indicating that the web object includes component A. Similarly, when the web content retriever 820 starts receiving component B 1010 from content server 860, injected code 1020 sends a message 1040 to layout generator indicating that the web object includes component B.

For a web object that includes many components, each component may be fully retrieved before or after other components. The code injected into each web frame sends a message to layout generator when the corresponding component is fully retrieved. For instance, when component B 1010 is fully retrieved, the code 1020 that is injected in the web frame used to retrieve component B sends a message 1045 to the layout generator to indicate that component B is fully retrieved. Similarly, when component A 1005 is fully retrieved, the code 1015 that is injected in the web frame used to retrieve component A sends a message 1040 to the layout generator to indicate that component A is fully retrieved.

Each of messages 1040 and 1045 also includes the height of the corresponding web object component. When the layout generator injected code into each web frame, layout generator also provides the desired rendering width of the document to the injected code. Once a component is fully retrieved into a web frame, the code injected in that web frame calculates the height of the component and provides the height to the layout generator. Once the layout generator receives all messages indicating every web object in the web content is retrieved, the layout generator uses the height of the outer component of the web object to determine the layout for the electronic document that will be rendered to include the retrieved web object.

Figure 11:
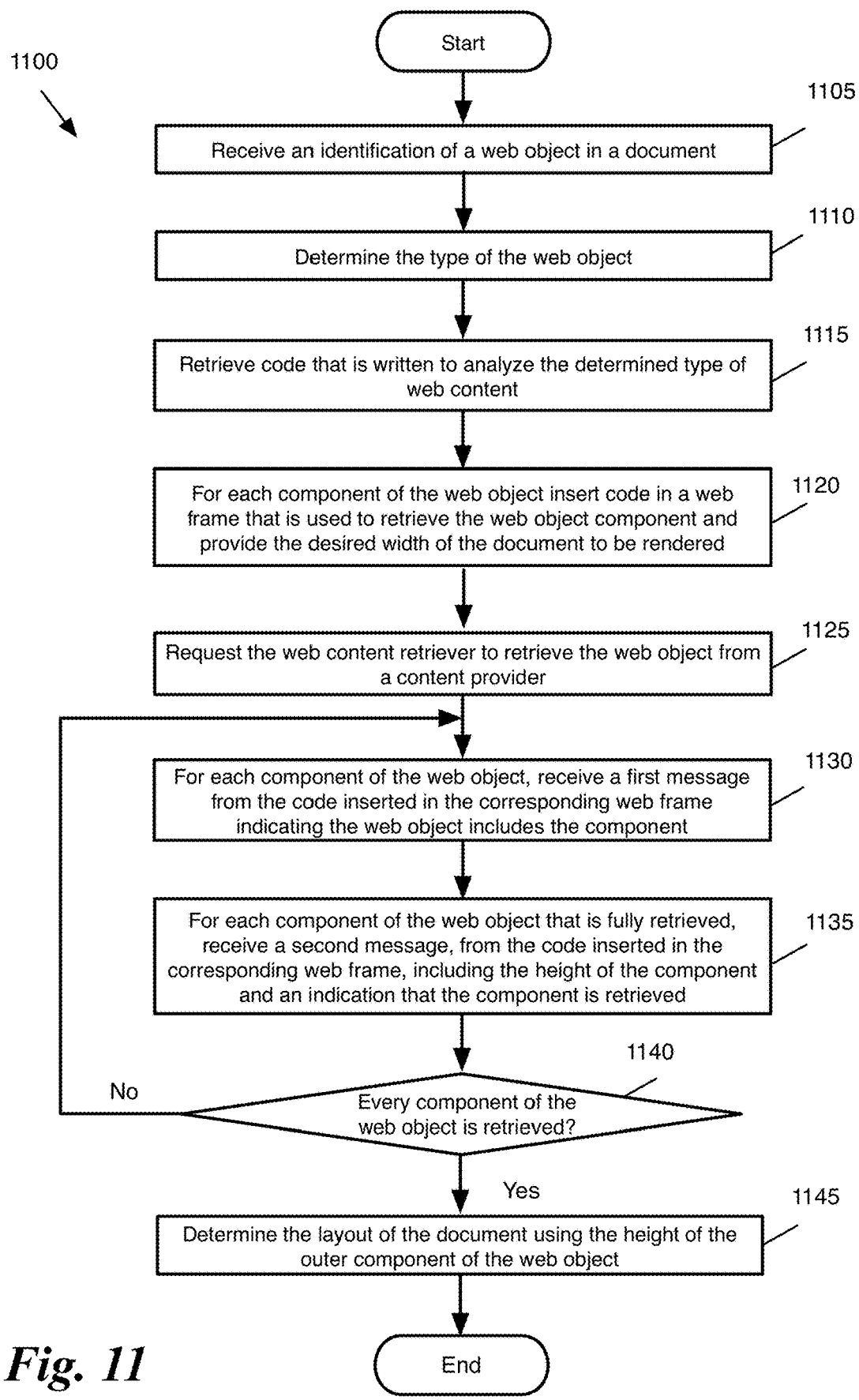
FIG. 11 conceptually illustrates a process for injecting code into web frames that are used to retrieve each component of a web object in order to receives the height of each component and an indication that each the web object component is fully retrieved.

FIG. 11 conceptually illustrates a process 1100 for injecting code into web frames that are used to retrieve each component of a web object in order to receives the height of each component and an indication that each the web object component is fully retrieved. The process in some embodiments, is performed by a layout generator such as layout generator 805 in FIGS. 8 and 10.

As shown, the process receives (at 1105) an identification of a web object in a document. For instance, when a user selects as document from a document summary page, the process retrieves the document definition structure of the selected document and determines that the document has to be rendered with one or more web objects.

The process then determines (at 1110) the type of the web object. Examples of the type of a web object include Twitter card, Facebook post, Facebook video, Vice video, Instagram photo, web objects provided by news content providers, etc. The process then retrieves (at 1115) code that is written to analyze the determined type of web content. For instance, each type of web object such as Twitter card, Facebook post, Facebook video, Vine video, etc., requires a corresponding piece of code that is custom made to analyze that type of web object. These pieces of code are frequently updated to reflect changes made by the web object providers to the format of the web objects.

For each component of the web object, the process injects (at 1120) code in a web frame that is used to retrieve the web object component. The process also provides the desired width of the document to be rendered to the injected code. The process then requests (at 1125) a web content retriever to retrieve the web object from a content provider. For instance, the process requests web content retriever 820 (that could, for example, be WebView) to retrieve the web object.

For each component of the web object, the process receives (at 1130) a first message from the code inserted in the corresponding web frame indicating the web object includes the component. For instance, the process receives messages similar to messages 1030 and 1040 shown in FIG.

10 for each component of the web object. For each component of the web object that is fully retrieved, the process receives (at 1135) a second message, from the code inserted in the corresponding web frame, including the height of the component and an indication that the component is fully retrieved. For instance, the process receives messages similar to messages 1035 and 1045 shown in FIG. 10 for each component of the web object.

The process repeats operations 1130 and 1135 for each component of the web object (as shown by operation 1140). Once all components are retrieved, the process determines (at 1145) the layout of the document by using the height of the outer component of the web object (which is the overall height of the web object). The process then ends. The layout is used by the document viewing application to render the document on a device display screen.

Figure 12:
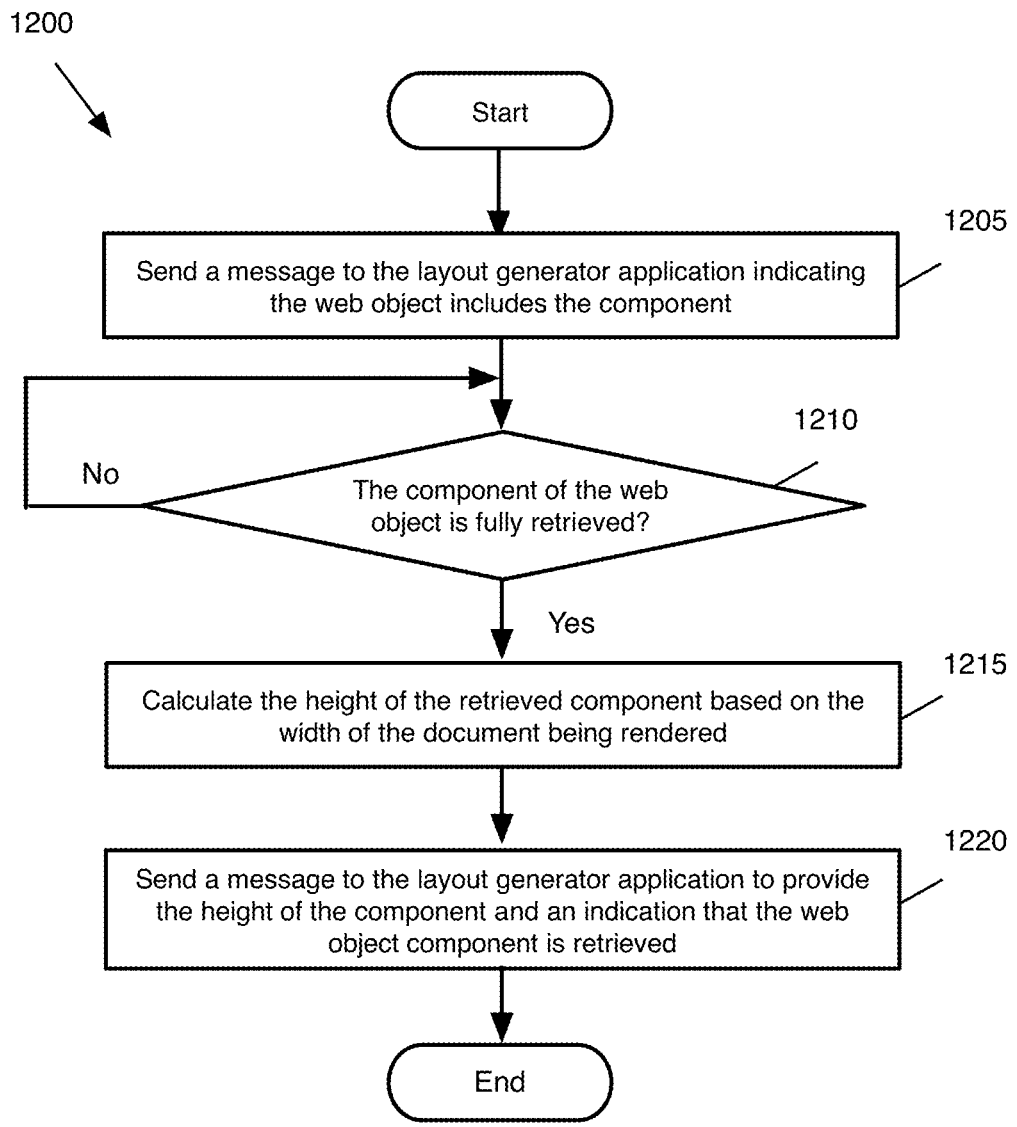
FIG. 12 conceptually illustrates a process for monitoring the retrieval and determining the height of a component of a web object in some embodiments.

FIG. 12 conceptually illustrates a process 1200 for monitoring the retrieval and determining the height of a component of a web object in some embodiments. Process 1200 in some embodiments is performed by code injected into a web frame that is used to retrieve a particular component of the web object. As shown, the process sends (at 1205) a message to layout generator indicating the web object includes the particular component. For instance, the process sends a message such as messages 1030 or 1040 once the web content retriever starts retrieving the component.

The process then determines (at 1210) whether the component is fully retrieved. If not, the process proceeds back to 1210 (e.g., after a predetermined amount of time). Otherwise, the process calculates (at 1215) the height of the retrieved component based on the width of the document being rendered. The process then sends (at 1220) a message to the layout generator to provide the height of the retrieved component and an indication that the web object component is fully retrieved. The process then ends.

IV. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

A. Mobile Device

Figure 13:
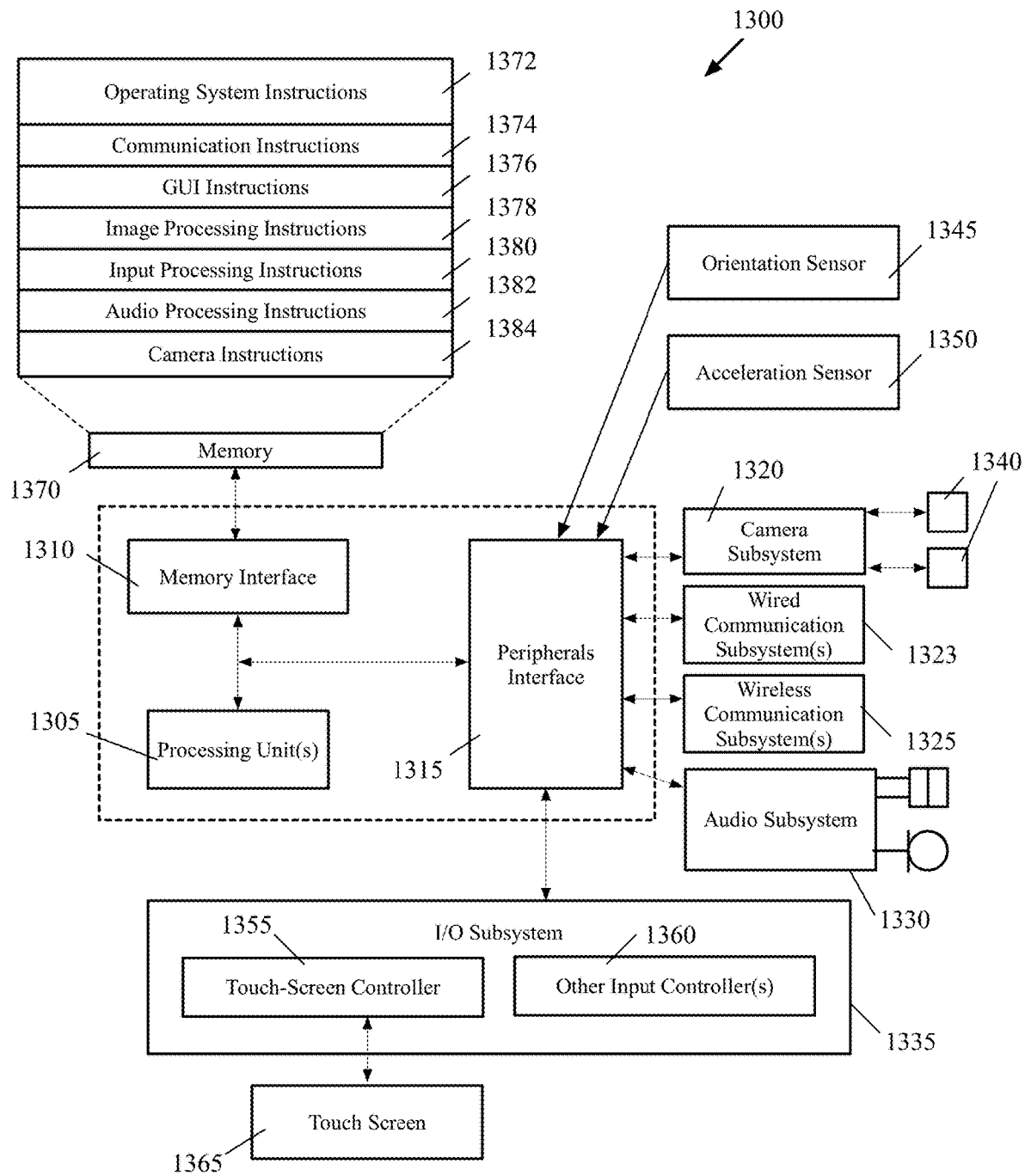
FIG. 13 is an example of an architecture of a mobile computing device in some embodiments.

The applications of some embodiments operate on mobile devices, such as smart phones (e.g., iPhones®) and tablets (e.g., iPads®). FIG. 13 is an example of an architecture 1300 of such a mobile computing device. Examples of mobile computing devices include smartphones, tablets, laptops, etc. As shown, the mobile computing device 1300 includes one or more processing units 1305, a memory interface 1310 and a peripherals interface 1315.

The peripherals interface 1315 is coupled to various sensors and subsystems, including a camera subsystem 1320, a wired communication subsystem(s) 1323, a wireless communication subsystem(s) 1325, an audio subsystem 1330, an I/O subsystem 1335, etc. The peripherals interface 1315 enables communication between the processing units 1305 and various peripherals. For example, an orientation sensor 1345 (e.g., a gyroscope) and an acceleration sensor 1350 (e.g., an accelerometer) is coupled to the peripherals interface 1315 to facilitate orientation and acceleration functions.

The camera subsystem 1320 is coupled to one or more optical sensors 1340 (e.g., a charged coupled device (CCD) optical sensor, a complementary metal-oxide-semiconductor (CMOS) optical sensor, etc.). The camera subsystem 1320 coupled with the optical sensors 1340 facilitates camera functions, such as image and/or video data capturing. The wireless communication subsystem 1325 serves to facilitate communication functions. In some embodiments, the wireless communication subsystem 1325 includes radio frequency receivers and transmitters, and optical receivers and transmitters (not shown in FIG. 13). These receivers and transmitters of some embodiments are implemented to operate over one or more communication networks such as a GSM network, a Wi-Fi network, a Bluetooth network, etc. The audio subsystem 1330 is coupled to a speaker to output audio (e.g., to output voice navigation instructions). Additionally, the audio subsystem 1330 is coupled to a microphone to facilitate voice-enabled functions, such as voice recognition (e.g., for searching), digital recording, etc.

The I/O subsystem 1335 involves the transfer between input/output peripheral devices, such as a display, a touch screen, etc., and the data bus of the processing units 1305 through the peripherals interface 1315. The I/O subsystem 1335 includes a touch-screen controller 1355 and other input controllers 1360 to facilitate the transfer between input/ output peripheral devices and the data bus of the processing units 1305. As shown, the touch-screen controller 1355 is coupled to a touch screen 1365. The touch-screen controller 1355 detects contact and movement on the touch screen 1365 using any of multiple touch sensitivity technologies. The other input controllers 1360 are coupled to other input/ control devices, such as one or more buttons. Some embodiments include a near-touch sensitive screen and a corresponding controller that can detect near-touch interactions instead of or in addition to touch interactions.

The memory interface 1310 is coupled to memory 1370. In some embodiments, the memory 1370 includes volatile memory (e.g., high-speed random access memory), non-volatile memory (e.g., flash memory), a combination of volatile and non-volatile memory, and/or any other type of memory. As illustrated in FIG. 13, the memory 1370 stores an operating system (OS) 1372. The OS 1372 includes instructions for handling basic system services and for performing hardware dependent tasks.

The memory 1370 also includes communication instructions 1374 to facilitate communicating with one or more additional devices; graphical user interface instructions 1376 to facilitate graphic user interface processing; image processing instructions 1378 to facilitate image-related processing and functions; input processing instructions 1380 to facilitate input-related (e.g., touch input) processes and functions; audio processing instructions 1382 to facilitate audio-related processes and functions; and camera instructions 1384 to facilitate camera-related processes and functions. The instructions described above are merely exemplary and the memory 1370 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

While the components illustrated in FIG. 13 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 13 may be split into two or more integrated circuits.

B. Computer System

Figure 14:
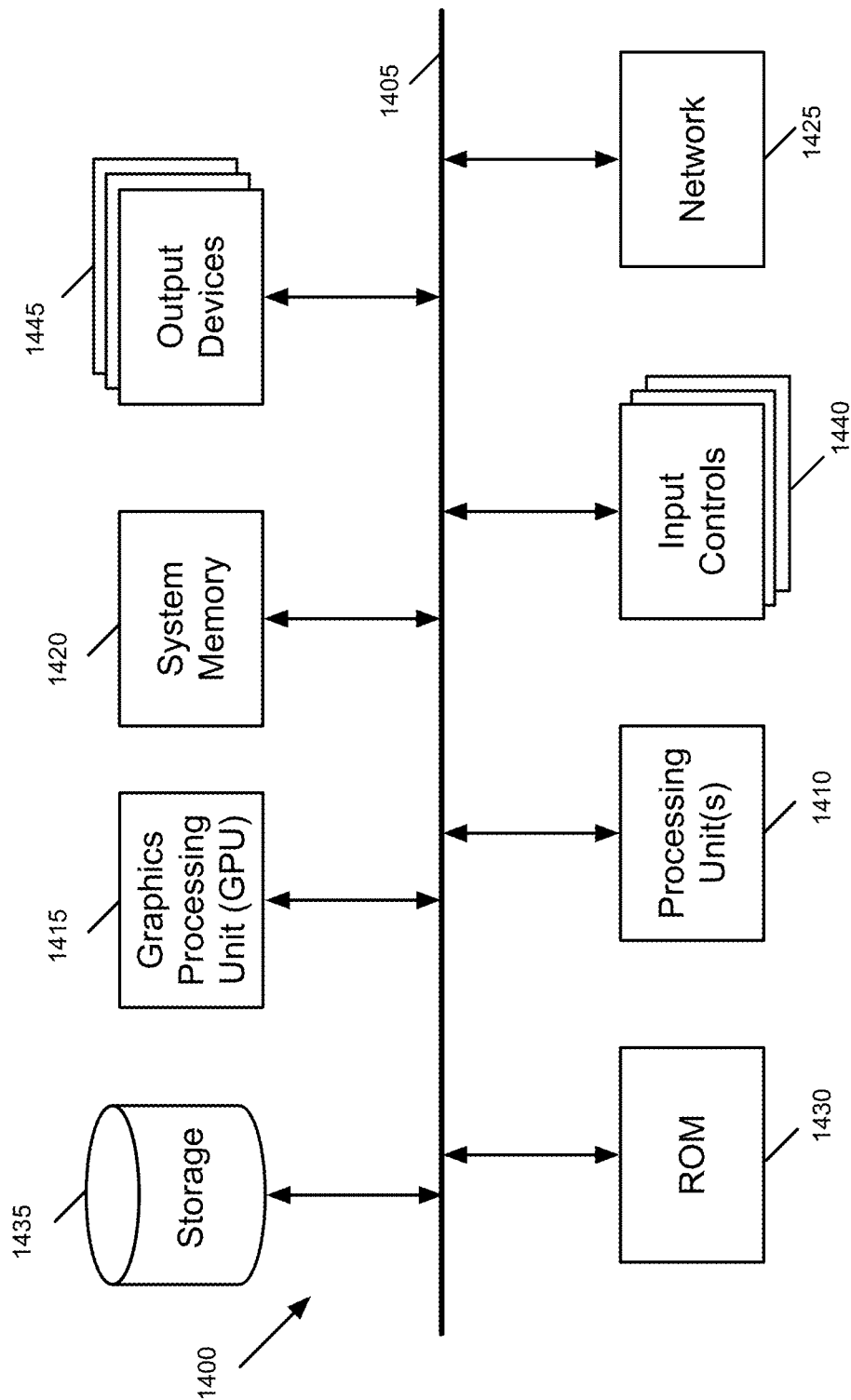
FIG. 14 conceptually illustrates another example of an electronic system with which some embodiments of the invention are implemented.

FIG. 14 conceptually illustrates another example of an electronic system 1400 with which some embodiments of the invention are implemented. The electronic system 1400 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 1400 includes a bus 1405, processing unit(s) 1410, a graphics processing unit (GPU) 1415, a system memory 1420, a network 1425, a read-only memory 1430, a permanent storage device 1435, input devices 1440, and output devices 1445.

The bus 1405 collectively represents all system, peripheral, and chipset buses that communicatively connect the numerous internal devices of the electronic system 1400. For instance, the bus 1405 communicatively connects the processing unit(s) 1410 with the read-only memory 1430, the GPU 1415, the system memory 1420, and the permanent storage device 1435.

From these various memory units, the processing unit(s) 1410 retrieves instructions to execute and data to process in order to execute the processes of the invention. The processing unit(s) may be a single processor or a multi-core processor in different embodiments. Some instructions are passed to and executed by the GPU 1415. The GPU 1415 can offload various computations or complement the image processing provided by the processing unit(s) 1410.

The read-only-memory (ROM) 1430 stores static data and instructions that are needed by the processing unit(s) 1410 and other modules of the electronic system. The permanent storage device 1435, on the other hand, is a read-and-write memory device. This device is a non-volatile memory unit that stores instructions and data even when the electronic system 1400 is off. Some embodiments of the invention use a mass-storage device (such as a magnetic or optical disk and its corresponding disk drive, integrated flash memory) as the permanent storage device 1435.

Other embodiments use a removable storage device (such as a floppy disk, flash memory device, etc., and its corresponding drive) as the permanent storage device. Like the permanent storage device 1435, the system memory 1420 is a read-and-write memory device. However, unlike storage device 1435, the system memory 1420 is a volatile read-and-write memory, such a random access memory. The system memory 1420 stores some of the instructions and data that the processor needs at runtime. In some embodiments, the invention's processes are stored in the system memory 1420, the permanent storage device 1435, and/or the read-only memory 1430. For example, the various memory units include instructions for processing multimedia clips in accordance with some embodiments. From these various memory units, the processing unit(s) 1410 retrieves instructions to execute and data to process in order to execute the processes of some embodiments.

The bus 1405 also connects to the input and output devices 1440 and 1445. The input devices 1440 enable the user to communicate information and select commands to the electronic system. The input devices 1440 include alphanumeric keyboards and pointing devices (also called "cursor control devices"), cameras (e.g., webcams), microphones or similar devices for receiving voice commands, etc. The output devices 1445 display images generated by the electronic system or otherwise output data. The output devices 1445 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 14 conceptually illustrates another example of an electronic system 1400 with which some embodiments of the invention are implemented. 14, bus 1405 also couples electronic system 1400 to a network 1425 through a network adapter (not shown). In this manner, the computer can be a part of a network of computers (such as a local area network ("LAN"), a wide area network ("WAN"), or an Intranet), or a network of networks, such as the Internet. Any or all components of electronic system 1400 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

We claim:

1. A method of determining a layout for an electronic document comprising a web object, the web object comprising a set of components, the method comprising:
   for each component of the web object, injecting code by a layout generation application into a web frame used to retrieve the component of the web object;
   sending a request to a web content retriever to retrieve the web object;
   for each component of the web object, receiving a message at the layout generation application from the injected code in the corresponding web frame indicating a completion of the retrieving of the component, each message comprising a height of the corresponding web object component based in part on a characteristic of the electronic document; and
   determining a layout for the web object by the layout generation application using the height of the web object components after the messages received from the injected code indicate every component of the web object is retrieved.

2. The method of claim 1 wherein the characteristic of the electronic document comprises
   a width of the electronic document from the layout generation application to the code injected in each web frame.

3. The method of claim 2, wherein the web object is received as a nested group of web frames, wherein the height of the web object is the height of an outermost component of the web object.

4. The method of claim 1, wherein the layout generation application is embedded in a native shell application, wherein the web content retriever is a web browser embedded in the native shell application.

5. The method of claim 1, wherein sending the request to retrieve the web object comprises:
   sending a link to the web object from the layout generation application to the web content retriever;
   sending a request from the web content retriever to a content provider server to retrieve the web object; and
   receiving the web object at the web content retriever from the content provider server.

6. The method of claim 1, wherein each web frame is an inline frame.

7. The method of claim 1, wherein the injected code comprises a content presentation structure language.

8. The method of claim 1, wherein the message received for each component in the web object is a second message in a pair of messages regarding the component, wherein the web object is specified in a markup language comprising a set of nested web frames, the method further comprising:
   analyzing each web object component by the code injected in the corresponding web frame as the web object component is retrieved by the web content retriever; and
   sending a first message in the pair of messages regarding each component from the code embedded in the corresponding web object to the layout generation application to indicate that the web object comprises the component.

9. The method of claim 8 further comprising:
   detecting, by each injected code, an end of the corresponding the web frame; and
   sending the second message regarding the corresponding component by the injected code to the rendering application indicating the completion of the retrieving of the component.

10. The method of claim 1, wherein the electronic document is an electronic article.

11. A non-transitory computer readable medium storing a program for a layout generation application for determining a layout for an electronic document comprising a web object, the web object comprising a set of components, the program executable by a processing unit, the program comprising sets of instructions for:
    for each component of the web object, injecting code by the layout generation application into a web frame used to retrieve the component of the web object;
    sending a request to a web content retriever to retrieve the web object;
    for each component of the web object, receiving a message at the layout generation application from the injected code in the corresponding web frame indicating a completion of the retrieving of the component, each message comprising a height of the corresponding web object component based in part on a characteristic of the electronic document; and
    determining a layout for the web object by the layout generation application using the height of the web object components after the messages received from the injected code indicate every component of the web object is retrieved.

12. The non-transitory computer readable medium of claim 11, wherein the characteristics of the electronic document comprises
    a width of the electronic document from the layout generation application to the code injected in each web frame.

13. The non-transitory computer readable medium of claim 12, wherein the web object is received as a nested group of web frames, wherein the height of the web object is the height of an outermost component of the web object.

14. The non-transitory computer readable medium of claim 11, wherein the layout generation application is embedded in a native shell application, wherein the web content retriever is a web browser embedded in the native shell application.

15. The non-transitory computer readable medium of claim 11, wherein the set of instructions for sending the request to retrieve the web object comprises sets of instructions for:
- sending a link to the web object from the layout generation application to the web content retriever;
- sending a request from the web content retriever to a content provider server to retrieve the web object; and
- receiving the web object at the web content retriever from the content provider server.

16. The non-transitory computer readable medium of claim 11, wherein each web frame is an inline frame.

17. The non-transitory computer readable medium of claim 11, wherein the injected code comprises a content presentation structure language.

18. The non-transitory computer readable medium of claim 11, wherein the message received for each component in the web object is a second message in a pair of messages regarding the component, wherein the web object is specified in a markup language comprising a set of nested web frames, the program further comprising sets of instructions for:
- analyzing each web object component by the code injected in the corresponding web frame as the web object component is retrieved by the web content retriever; and
- sending a first message in the pair of messages regarding each component from the code embedded in the corresponding web object to the layout generation application to indicate that the web object comprises the component.

19. The non-transitory computer readable medium of claim 18, the program further comprising sets of instructions for:
- detecting, by each injected code, an end of the corresponding the web frame; and
- sending the second message regarding the corresponding component by the injected code to the rendering application indicating the completion of the retrieving of the component.

20. The non-transitory computer readable medium of claim 11, wherein the electronic document is an electronic article.

* * * * *